United States Patent [19]

Kranz

[11] Patent Number: 4,852,827

[45] Date of Patent: Aug. 1, 1989

[54] APPARATUS FOR CONTROLLING A PROJECTILE

[75] Inventor: Walter Kranz, Taufkirchen, Fed. Rep. of Germany

[73] Assignee: Messerschmitt-Bölkow-Blohm GmbH, Munich, Fed. Rep. of Germany

[21] Appl. No.: 167,823

[22] Filed: Mar. 14, 1988

[30] Foreign Application Priority Data

Mar. 14, 1987 [DE] Fed. Rep. of Germany ....... 3708312

[51] Int. Cl.⁴ .......................................... F42B 15/033
[52] U.S. Cl. .................................................. 244/3.22
[58] Field of Search ........................................ 244/3.22

[56] References Cited

U.S. PATENT DOCUMENTS

| | | | |
|---|---|---|---|
| 3,165,889 | 1/1965 | Kershner et al. | 244/3.22 |
| 3,249,325 | 5/1966 | Forehand | 244/3.22 |
| 4,384,690 | 5/1983 | Brodersen | 244/3.22 |
| 4,589,594 | 5/1986 | Kranz | 244/3.22 |
| 4,691,876 | 9/1987 | Kranz | 244/3.22 |

FOREIGN PATENT DOCUMENTS 1286239 1/1962 France ........................... 244/3.22

Primary Examiner—Charles T. Jordan
Attorney, Agent, or Firm—Kenyon & Kenyon

[57] ABSTRACT

The invention relates to an apparatus for controlling a projectile (1) having a nozzle arrangement (2) rotatably arranged in the projectile housing. The nozzle arrangement comprises a rotary nozzle body (3) with a thrust nozzle (4) which nozzle body can be brought into any desired angular position by means of a positioning drive. The rotary nozzle body (3) is coupled to a gas generator (7) for a propellant gas supply. For optimum utilization of the propellant gas of the gas generator, in all angular positions of the rotary nozzle body (3), the axis of rotation (a) of the rotary nozzle body (3) is arranged to be non-parallel to the longitudinal axis (A) of the projectile. In addition, guiding means (4, 11, 12, 13, 14) are provided for the gas jet which steer the latter, depending on the angular position of the rotary nozzle body (3), substantially crosswise to the longitudinal axis (A) of the projectile for steering said projectile or into a direction substantially parallel to the longitudinal axis (A) of the projectile to provide an additional propulsion to the projectile. Preferably, the rotary nozzle body (3) comprises an offset thrust nozzle (4) and is incident with its axis of rotation (a) to the longitudinal axis (A) of the projectile in an acute angle (beta).

3 Claims, 3 Drawing Sheets

APPARATUS FOR CONTROLLING A PROJECTILE

BACKGROUND OF THE INVENTION

The invention relates to an apparatus for controlling a projectile.

From DE-PS 33 17 583 such as apparatus with a nozzle arrangement in the projectile housing is known, the nozzle arrangement being supplied from a propellant source and comprising a thrust nozzle. The nozzle arrangement is supplied with a propellant continuously and is maintained in rapid rotation, also continuously. This rotation can be produced by the propellant itself. To eject the propellant jet in a defined direction crosswise to the projectile's axis, a brake is provided with which the continuous rotation of the nozzle arrangement can be stopped so that the thrust nozzle points in the desired direction.

The propellant jet issuing from the thrust nozzle is ejected through blow holes in the projectile housing. If the projectile is not to be controlled because it is in the correct trajectory, either the nozzle arrangement is maintained in fast rotation, so that the propellant jet issues in rapid succession through all blow holes on the circumference of the projectile and, accordingly, the transverse forces exerted on the projectile add up to zero, or the nozzle arrangement is rotated into a position in which the propellant jet does not issue from the projectile housing, but rather, the propellant is collected, for example, in an annular channel and is ejected from the projectile in such a way that no transverse forces act on the projectile. In this connection, it has heretofore been proposed to use these collected propellants to support the forward movement of the projectile. However, the driving force obtained thereby is very small, in particular for the reason that the propellant jet is to be deflected by considerable angles, so that the thrust is in large part lost due to friction forces.

SUMMARY OF THE INVENTION

It is the object of the present invention to provide an apparatus of the above-described type by which the energy of the propellant jet is better utilized.

According to the invention, the above stated objectives are achieved by the utilization of guide means or guide channels to selectively guide the propellant either transverse to the longitudinal axis of the projectile to thereby steer the projectile or parallel to the longitudinal axis of the projectile to provide additional propulsion.

Accordingly, with the apparatus of the invention, a controlled ("targeted") axial thrust for the additional propulsion of the projectile and a controlled transverse thrust, possibly also in several directions, for steering the projectile with respect to pitch, yaw and roll, can be built up. The decisive point is that the energy of the propellant jet is utilized approximately completely for the respective purpose, in particular as the propellant jet is deflected only slightly or not at all.

In a preferred embodiment of the invention, a nozzle arrangement with a thrust nozzle offset to the axis of rotation thereof is used. The nozzle is installed obliquely in the projectile housing, so that its axis of rotation is not parallel to the projectile's longitudinal axis. Preferably it is installed in a plane containing the projectile's longitudinal axis, the axis of rotation of the nozzle arrangement being incident on the projectile's longitudinal axis at an acute angle, and the thrust nozzle being offset relative to the axis of rotation of the nozzle arrangement by an angle which complements the angle of incidence to about 90°. The angle of incidence and angle of offset are, in practice, approximately between 30° and 60° respectively. With such an installation of the nozzle arrangement in the projectile housing it is practically not necessary to deflect the propellant jet issuing from the thrust nozzle in the operating positions of axial thrust or transverse thrust.

An offset nozzle arrangement according to the invention can be mounted also incident relative to the projectile's longitudinal axis in the tail region of the projectile. Such an arrangement then replaces e.g. the known jet spoilers for the steering of projectile, but compared to them it is much more efficient, since in one operating position of the nozzle arrangement, the propellant jet is ejected directly perpendicular to the projectile's longitudinal axis. In the other position an axial thrust is given off parallel to the projectile's longitudinal axis or in the direction of the projectile's longitudinal axis.

The invention is explained more specifically with respect to exemplary embodiments with reference to the drawings, in which:

DETAILED DESCRIPTION

Figure 1:
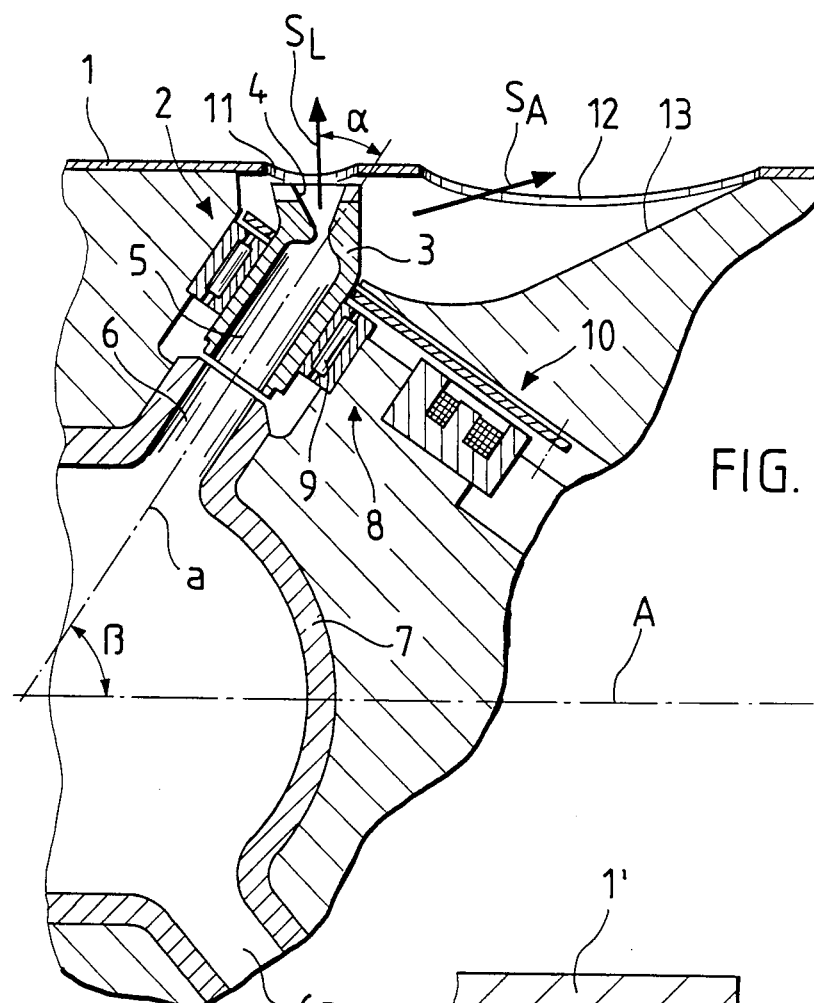
FIG. 1 is a transverse section through a part of a projectile with a nozzle arrangement according to the invention for producing a transverse or axial thrust.

In a projectile 1, whose longitudinal axis is marked A, a nozzle arrangement 2 is installed. The nozzle arrangement 2 comprises a rotary nozzle body 3 with an axis of rotation (a) and a thrust nozzle 4 offset relative to the axis of the rotary nozzle body 3 by an angle $\alpha$. The axis of rotation (a) is incident, relative to the projectile's longitudinal axis A, by and angle $\beta$. The rotary nozzle body 3 has coaxial with its axis of rotation (a) a gas channel 5 which leads into the thrust nozzle 4 and communicates, at its other end, with the outlet 6 of a gas generator 7. The angles $\beta$ and $\alpha$ are, for example, 40° and 50°, respectively.

For the rotary nozzle body 3 a positioning drive 8 is provided, with which the rotary nozzle body 3 can be rotated about its axis of rotation (a) and can be stopped in any desired angular position. The rotary nozzle body 3 is supported in a needle bearing 9. The positioning drive 8 may be of any kind. Thus, for example, the rotary drive of the rotary nozzle body 3 may itself occur through the gas flowing out of the gas generator 7. The rotary nozzle body can be stopped, e.g., by an electromagnetic brake 10. For the drive of the rotary nozzle body, reference is made to the above-mentioned Patent 33 17 583. Two blow holes 11 and 12 are provided in the outer wall of projectile 1. In the illustrated position of the rotary nozzle body 3, the thrust nozzle 4 ends directly below the blow hole 11. When gas flows from the gas generator 7 through the rotary nozzle body, a transverse thrust SL, perpendicular to the projectile's longitudinal axis A, is produced. The thrust SL acts on the projectile 1 as a transverse force by which the projectile can be steered.

If the rotary nozzle body 3 is rotated 180° about its axis of rotation (a) by means of the positioning drive 8 and is held in this new position, then the gas ejected from the thrust nozzle 4 flows through a guide channel 13 which ends at the hole 12. The guide channel 13 is directed more or less axially rearward against the tail of the projectile, so that an axial thrust SA is produced, which supports the propulsion of the projectile. This second position of the rotary nozzle body 3 is the normal position. The rotary nozzle body 3 is brought into the illustrated position only if the projectile is to be steered.

Figure 2:
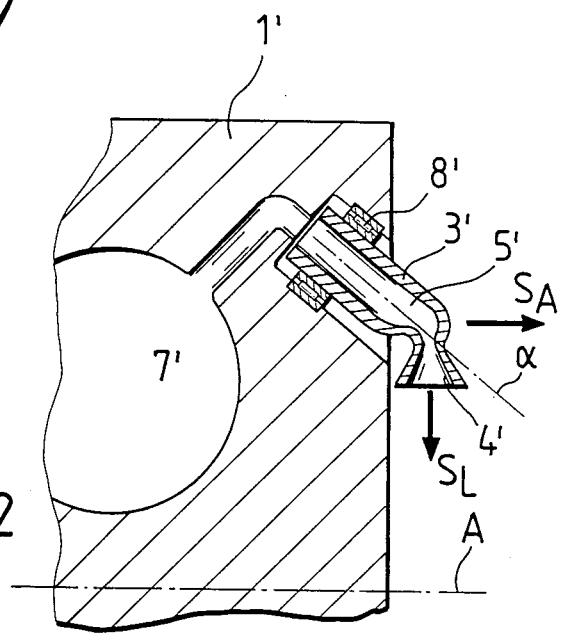
FIG. 2 is a transverse section through a projectile in the tail region with a nozzle arrangement according to the invention.

FIG. 2 illustrates the tail region of a projectile 1', in which a rotary nozzle body 3' is again installed with its axis of rotation (a) oblique to the projectile's longitudinal axis A. The layout of the rotary nozzle body 3' is the same as in FIG. 1 and hence has a gas channel 5' and an offset thrust nozzle 4'. The rotary nozzle body 3' is supplied from a gas generator 7' and can be positioned and held in different angular positions by means of the indicated positioning drive 8'. The angle of incidence of the rotary nozzle body relative to the projectile's longitudinal axis and the offset angle of the thrust nozzle complement to 90°.

In the shown position of the rotary nozzle body 3', a transverse thrust SL, perpendicular to the projectile's longitudinal axis, and in the direction thereof, is produced, whereby the projectile 1' can be steered. If the rotary nozzle body 3' is rotated 180° about its axis of rotation (a), the thrust nozzle 4' is oriented parallel to the projectile's longitudinal axis A. The axial thrust SA produced therewith is parallel to the projectile's longitudinal axis A and supports the propulsion of the projectile 1'.

The arrangement shown in FIG. 2 thus replaces conventional jet spoilers. Naturally, it is possible to arrange the rotary nozzle body 3' in the projectile in such a way that the axial thrust SA lies in the projectile's longitudinal axis. For the creation of a transverse thrust in any transverse direction, the, e.g., continuous rotation of the projectile about the longitudinal axis is then absolutely necessary. If such an arrangement is not possible, e.g., due to an axial jet engine, it is necessary to provide, at least on the opposite side of the longitudinal axis A of projectile 1', a second rotary nozzle body, in order to prevent any steering forces which may act on the projectile. Thereby in the various relative positions of the thrust nozzles, an axial or transverse thrust or a roll moment can be produced and, depending on the number of nozzles, a more or less variable distribution of these forces or moments can be achieved.

Figure 2A:
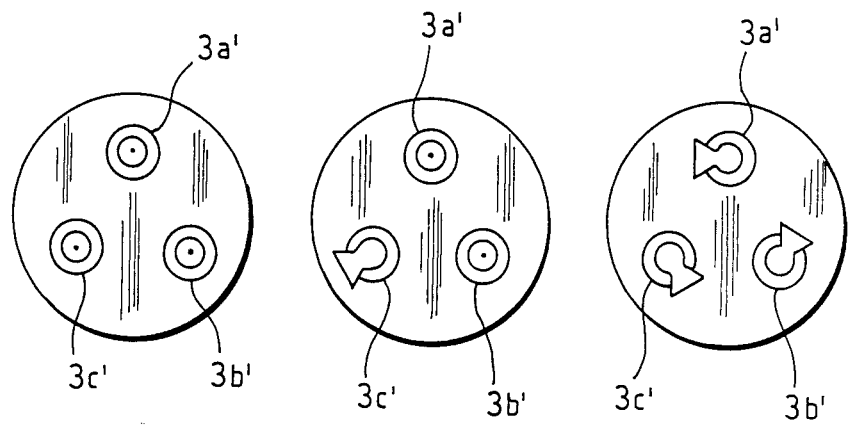
FIG. 2a is a rear view of the projectile with a nozzle arrangement illustrated in FIG. 2.

In FIG. 2a there is illustrated an example of an arrangement of three rotary nozzle bodies 3a', 3b' and 3c' in different angular positions, in each instance. In the first angular position, an axial thrust is produced, in the second, a transverse thrust, and in the third, a roll moment.

Figure 3:
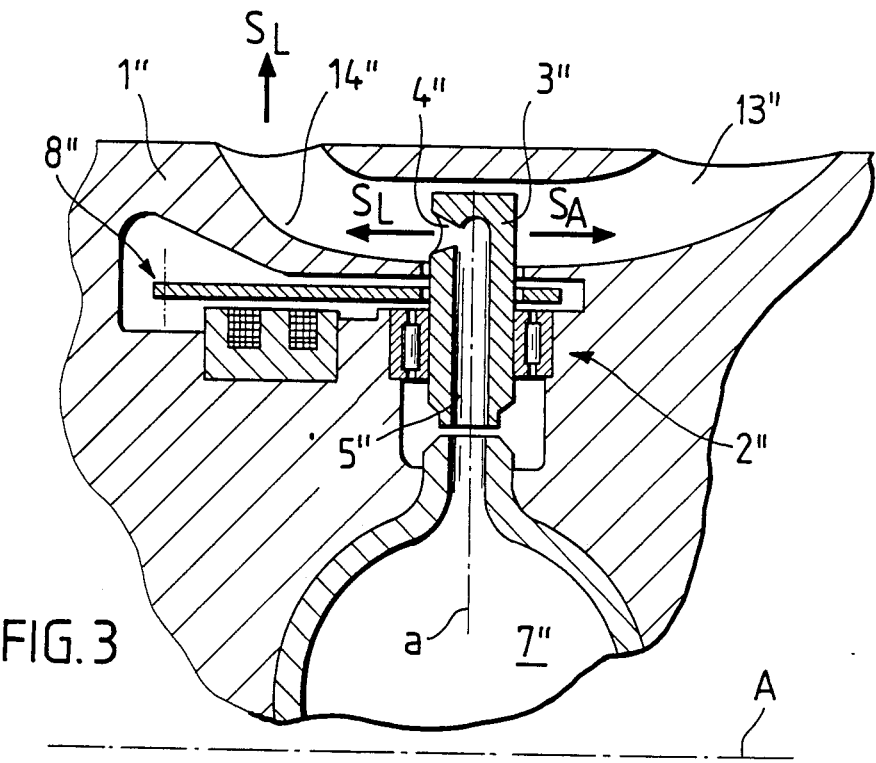
FIG. 3 is a further transverse section through a part of a projectile with a nozzle arrangement according to the invention for the production of transverse thrusts in several directions.
Figure 4:
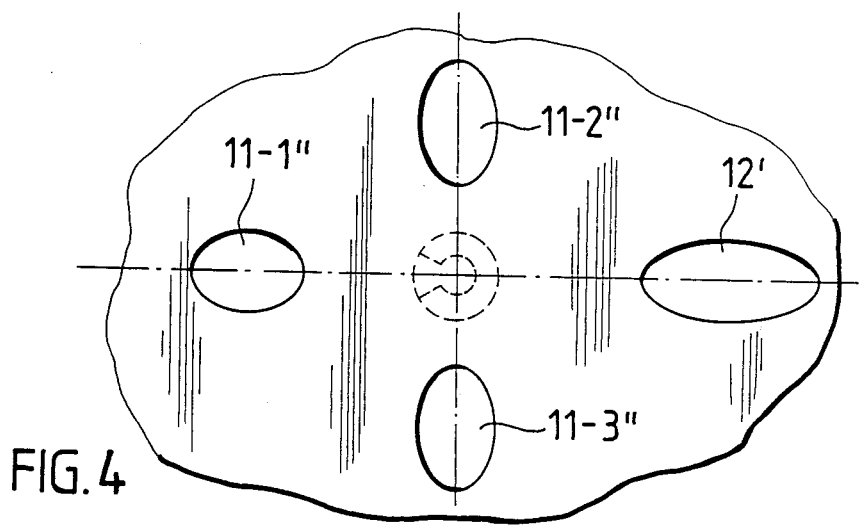
FIG. 4 is a top view onto the housing of the projectile according to FIG. 3 in the region of the nozzle arrangement.

FIGS. 3 and 4 illustrate another embodiment of a nozzle arrangement 2" according to the invention installed in a projectile 1". The nozzle arrangement 2" again comprises a rotary nozzle body 3" with an axis of rotation (a) and a gas channel 5" coaxial therewith and a thrust nozzle 4" whose median axis is perpendicular to the axis of rotation (a). The rotary nozzle body 3" is installed with its axis of rotation (a) perpendicular to the projectile's longitudinal axis A. The rotary nozzle body 3" is supplied by a gas generator 7". For the rotary nozzle body 3" there is further provided a positioning drive 8". By means of the positioning drive 8", the thrust nozzle 4" can be brought into four angular positions, between each of which there is an angle of 90°. In these angular positions the rotary nozzle body 3" communicates with three guide channels 14", which in the projectile 1" extend forward or crosswise to the projectile's longitudinal axis, and with a rearwardly extending guide channel 13". The guide channels 14" and 13" discharge into blow holes 11-1", 11-2" and 11-3" or 12". The channel 14" leading to blow hole 11-1" is, according to FIG. 3, curved slightly upward, so that the gas issuing therefrom creates a transverse thrust SL approximately perpendicular to the projectile axis A. The guide channels 14", leading to the blow holes 11-2" and 11-3", are straight and also create a transverse thrust, by which the roll position of the projectile 1" can be influenced. The gas jet issuing from blow hole 12" creates an axial thrust SA approximately parallel to the projectile's longitudinal axis a, by which the propulsion of the projectile is supported. It is possible to arrange this blow hole 12" at the tail of the projectile, so that the guide channel 13" runs parallel to the projectile's longitudinal axis A.

As has been mentioned with reference to the embodiment of FIG. 2, it is, of course, possible also, in all other embodiments, to provide several nozzle arrangements in the projectile. These nozzle arrangements can then be supplied from a single gas generator. In FIG. 1 this possibility is indicated by an additional outlet 6a of the gas generator.

It is evident from the description that, by a suitable position of the axis of rotation of the rotary nozzle body and the orientation of the rotary nozzle with respect to the projectile's longitudinal axis, transverse thrust for steering the projectile and axial thrusts for supporting the projectile propulsion can be built up in a controlled manner, The arrangements are usable to advantage for high-speed guided shells, as the nozzle arrangement is highly miniaturizable and can be brought into the respective positions at high speeds.

What is claimed is:

1. In an apparatus for controlling a projectile having a housing and including a nozzle arrangement rotatably disposed in said projectile housing, which arrangement is coupled to a propellant source and comprises a rotary nozzle body having a thrust nozzle, and a positioning drive for controlled adjustment of the angular position of the rotary nozzle body, such that a propellant jet from said thrust nozzle can be ejected approximately perpendicular to the longitudinal axis of said projectile for steering of said projectile, an improvement wherein the axis of rotation of said rotary nozzle body is arranged to be non-parallel to the longitudinal axis of said projectile, and guide means being provided to guide the propellant jet from said thrust nozzle, said positioning drive being operable to rotate said rotary nozzle body into predetermined angular positions and said guide means being arranged to guide said propellant jet in a first angular position of said rotary nozzle body substantially crosswise to the longitudinal axis of said projectile for steering said projectile and in a second angular position substantially parallel to the longitudinal axis of said projectile to provide additional propulsion of said projectile, and wherein the guide means comprises first and second guide means, each of the guide means being disposed in said projectile housing, said first guide means being in fluid communication with said thrust nozzle in said first angular position and said second guide means being in fluid communication with said thrust nozzle in said second angular position.

2. The apparatus of claim 1, wherein the axis of rotation of said rotary nozzle body is arranged in a plane containing the longitudinal axis of said projectile, said axis of rotation begin disposed at an acute angle of incidence to the longitudinal axis of said projectile, and said thrust nozzle being offset relative to the axis of rotation by an angle which complements said angle of incidence between the axis of rotation and the longitudinal axis of said projectile to about 90°.

3. The apparatus of claim 1, wherein said first and second guide means each comprise a guide channel arranged in said projectile housing, each guide channel being configured to provide a substantially straight line flow of said propellant jet.

* * * * *

UNITED STATES PATENT AND TRADEMARK OFFICE
CERTIFICATE OF CORRECTION

PATENT NO. : 4,852,827
DATED : August 1, 1989
INVENTOR(S) : Walter Kranz

It is certified that error appears in the above-identified patent and that said Letters Patent is hereby corrected as shown below:

In Column 1, line 8, change "...such as apparatus..."
to read --...such an apparatus...--

Column 2, line 15, change "...steering of projectile,"
to read --...steering of projectiles,--

Column 2, line 51, change "...by and angle $\beta$ ."
to read --...by an angle $\beta$ .--

Column 4, line 27, change "...longitudinal axis a,..."
to read --...longitudinal axis A,...--

Column 4, line 41, change "...of the rotary nozzle..."
to read --...of the thrust nozzle...--

Column 4, line 42, change "...transverse thrust,"
to read --...transverse thrusts,--

Signed and Sealed this

Thirteenth Day of November, 1990

Attest:

HARRY F. MANBECK, JR.

*Attesting Officer*  *Commissioner of Patents and Trademarks*